United States Patent [19]

Sharp

[11] Patent Number: 5,430,237
[45] Date of Patent: Jul. 4, 1995

[54] METHOD OF SOLIDIFYING OIL FIELD WASTE

[76] Inventor: Terry F. Sharp, Rte. 1 Box 1605, Wilburton, Okla. 74578

[21] Appl. No.: 305,422

[22] Filed: Sep. 13, 1994

Related U.S. Application Data

[63] Continuation of Ser. No. 34,873, Mar. 19, 1993, abandoned.

[51] Int. Cl.⁶ ............................................. B09B 3/00
[52] U.S. Cl. ...................................... 588/252; 71/13; 71/903; 175/66; 405/128; 405/263
[58] Field of Search ............... 405/128, 129, 263, 264; 588/252; 166/293; 175/66, 206; 71/13, 903; 210/747, 751

[56] References Cited

U.S. PATENT DOCUMENTS

| | | | |
|---|---|---|---|
| 4,028,240 | 6/1977 | Manchak | 588/252 |
| 4,460,292 | 7/1984 | Durham et al. | 175/66 X |
| 4,668,128 | 5/1987 | Hartley et al. | 405/128 X |
| 4,883,125 | 11/1989 | Wilson et al. | 175/66 X |
| 4,895,665 | 1/1990 | Colelli et al. | 175/66 X |
| 4,913,585 | 4/1990 | Thompson et al. | 405/128 |

Primary Examiner—Dennis L. Taylor

[57] ABSTRACT

A method of solidifying oil base shale cuttings and used drilling mud on site by thoroughly mixing the shale cuttings and drilling mud with an activated lime mixture to form a uniform dispersion of the lime mixture throughout the composite. Water from the drilling mud or from water added as needed activates the admixed lime causing a reaction which generates substantial heat and steam. The generated heat will dry the mixture and neutralize its acidic components producing an environmentally safe end product which may be cultivated into a ground surface without the need for special storage pits or the like.

1 Claim, 1 Drawing Sheet

METHOD OF SOLIDIFYING OIL FIELD WASTE

This application is a continuation of application Ser. No. 08/034,873, filed Mar. 19, 1993, now abandoned.

BACKGROUND OF THE INVENTION

1. Field of the Invention

The present invention relates to waste treatment and more particularly pertains to a method which is especially adapted to the treatment and solidification of oil field wastes such as oil shale cuttings and used drilling mud.

2. Description of the Prior Art

The use of oil field waste treatment is known in the prior art. More specifically, methods heretofore devised and utilized for the purpose of such treatment are known to consist basically of familiar, expected and obvious structural configurations and compositions, notwithstanding the myriad of designs encompassed by the crowded prior art which have been developed for the fulfillment of countless objectives and requirements.

Drilling mud, utilized to lubricate and cool the drill bit in use and to carry shale cuttings back to the surface as it is circulated from the drill pipe and back to the surface, although it usually is cleaned and reused will eventually wear out and require replacement. The used mud and shale cuttings are normally stored in pits excavated alongside the well being drilled. Ultimately this material must be removed and disposed of. Major costs are incurred in such disposal which usually terminates with the material being buried and soil used to cover the material. Since this method frequently results in seepage into ground waters it is frowned upon by the increasingly strong environmental concerns of today's world. Consequently various approaches to eliminating the problem have heretofore been proposed involving techniques for solidifying the waste products. Typical methods are disclosed in U.S. Pat. Nos. 4,338,134; 3,837,872; 4,880,468; 4,460,292; and 3,383,228.

In this respect, the method according to the present invention substantially departs from the conventional concepts and designs of the prior art, and in so doing provides a method primarily developed for the purpose of on-site solidifying and neutralizing such oil field wastes to produce an environmentally sound product.

SUMMARY OF THE INVENTION

In view of the foregoing disadvantages inherent in the known types of oil field waste disposal now present in the prior art, the present invention provides an improved method wherein the same can be utilized ... As such, the general purpose of the present invention, which will be described subsequently in greater detail, is to provide a new and improved method which has all the advantages of the prior art methods and none of the disadvantages.

To attain this, the present invention essentially comprises a method of solidifying oil base shale cuttings and used drilling mud on site by thoroughly mixing the shale cuttings and drilling mud with an activated lime mixture to form a uniform dispersion of the lime mixture throughout the composite. Water from the drilling mud and from water added as needed activates the admixed lime causing a reaction which generates substantial heat and steam. The generated heat will dry the mixture and neutralize its acidic components producing an environmentally safe end product which may be cultivated into a ground surface without the need for special storage pits or the like.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining the invention in detail, it is to be understood that the phraseology and terminology employed herein are for the purpose of description and should not be regarded as limiting.

It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved method for solidifying oil field waste which has all the advantages of the prior art methods and none of the disadvantages.

It is another object of the present invention to provide a new and improved oil field waste treatment method which may be easily and efficiently marketed.

Still yet another object of the present invention is to provide a new and improved oil field waste treatment method which provides in the apparatuses and methods of the prior art some of the advantages thereof, while simultaneously overcoming some of the disadvantages normally associated therewith.

Still another object of the present invention is to provide a new and improved method of eliminating oil field waste.

Yet another object of the present invention is to provide a new and improved method for solidifying oil field waste to produce an environmentally sound end product.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying flow sheet in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawing wherein.

DESCRIPTION OF THE PREFERRED EMBODIMENT

Figure 1:
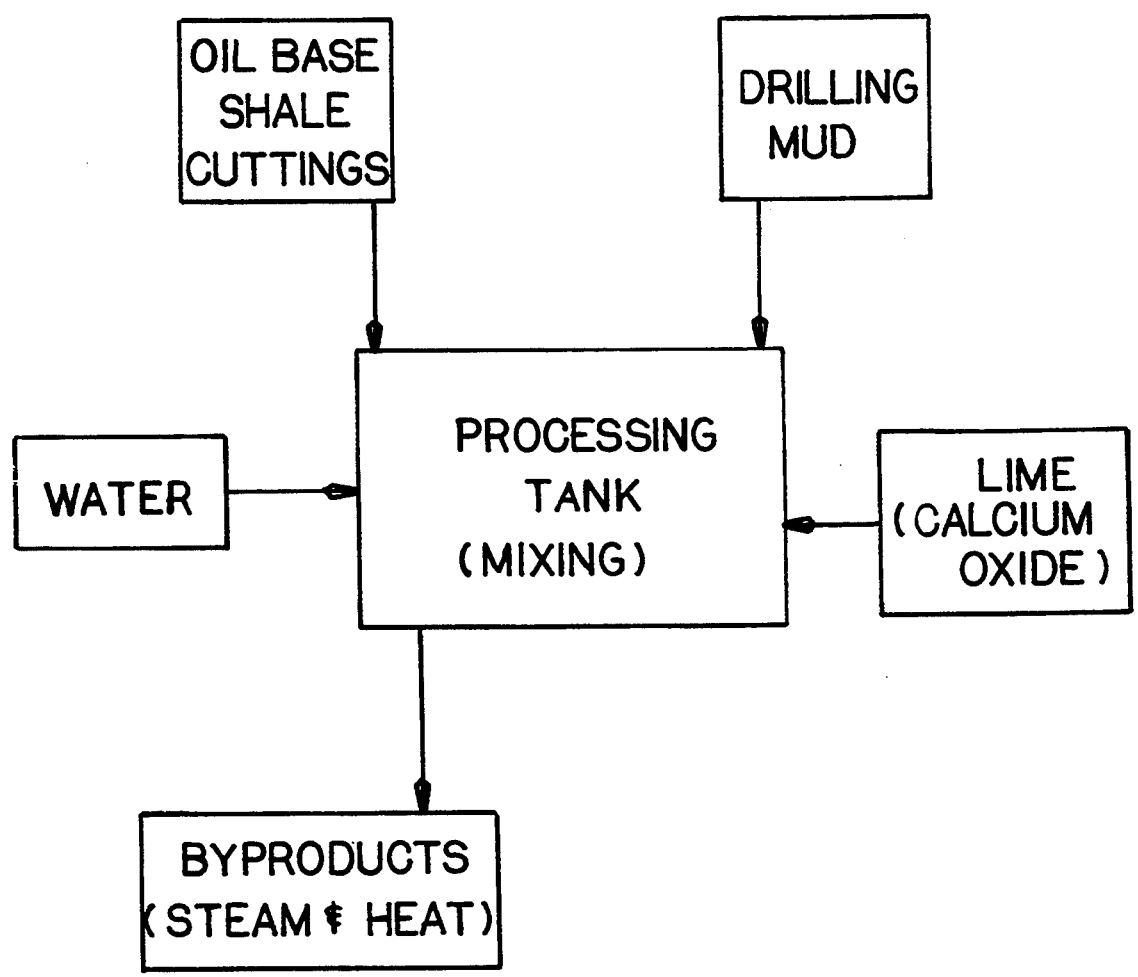
FIG. 1 is a schematic flow sheet of the method of the present invention.

With reference now to the flow sheet of FIG. 1, a new and improved method embodying the principles and concepts of the present invention will be described.

The oil base shale cuttings and used drilling mud from the temporary holding pits is picked up by a power shovel or backhoe and loaded into an open hopper provided with a heavy duty mechanical mixer or agitator. After thorough mixing to form a slurry, calcium oxide is added and additional water depending upon the consistency of the slurry. Continued agitation disperses the calcium oxide throughout the slurry wherein the water from the mud and/or added water reacts with the calcium oxide to hydrate the same and to generate a substantial amount of heat. When correct proportions are used the slurry will solidify as the water is exhausted in the form of steam. Acids present in the slurry will be neutralized by the added lime and the resultant semi-dried slurry will be environmentally safe to mix into regular soil and will support the growth of grasses or other vegetation thereon. It has been found useful as a controlled application on some location pad areas and reclaimed reserve pit areas around a still producing oil well. The method can also be used to dry up spills of diesel oil, crude oil, etc., in a small area. While primarily used as a batch operation, should there be sufficient quantities of waste to justify the equipment costs it can be utilized in a semi-continuous system utilizing conduits with worm-type mixing conveyors therein. The optimum concentration of components to generate the high heat required comprises two parts of oil base shale cuttings, one part calcium oxide and one part water.

As to the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method for disposing of oil field waste products which comprises mixing oil base shale cuttings with used drilling mud to form a slurry thereof; thoroughly agitating said slurry; adding calcium oxide, per se, to such slurry under agitation; and continuing such agitation to distribute the calcium oxide therethrough in contact with sufficient water to hydrate the calcium oxide and to thereby generate high heat; venting off the excess water from the slurry in the form of steam and neutralizing the mixture to produce an environmentally safe end product; and mixing said end product into soil wherein said soil will support a growth of grasses and other vegetation thereon, wherein the proportions of the mixture comprise two parts oil base shale cuttings, one part calcium oxide, and one part water to result in the end product capable of being mixed with said soil.

* * * * *